United States Patent [19]

Cole

[11] Patent Number: 4,853,906
[45] Date of Patent: Aug. 1, 1989

[54] APPARATUS FOR GENERATING ELLIPTICALLY POLARIZED SHEAR WAVES

[75] Inventor: Jack H. Cole, Ponca City, Okla.

[73] Assignee: Conoco Inc., Ponca City, Okla.

[21] Appl. No.: 207,935

[22] Filed: Jun. 13, 1988

Related U.S. Application Data

[62] Division of Ser. No. 897,434, Aug. 18, 1986, abandoned.

[51] Int. Cl.⁴ .................................................. G01V 1/00
[52] U.S. Cl. .................................... 367/189; 181/121; 181/114
[58] Field of Search ............. 181/106, 108, 111, 113, 181/114, 119, 121, 401; 367/48, 49, 75, 143, 189, 190; 73/663, 667, 672; 74/64, 87; 310/81

[56] References Cited

U.S. PATENT DOCUMENTS

| | | | |
|---|---|---|---|
| 3,034,594 | 5/1962 | Menzel et al. | 367/49 |
| 3,185,250 | 5/1965 | Glazier | 181/401 X |
| 3,280,935 | 10/1966 | Brown | 367/189 |
| 3,504,756 | 4/1970 | Bodine | 181/114 |
| 3,578,081 | 5/1971 | Bodine | 181/106 |
| 3,587,774 | 6/1971 | Bemrose et al. | 181/401 X |
| 3,683,326 | 8/1972 | White | 367/75 X |
| 4,164,982 | 8/1979 | Draney | 172/40 |
| 4,218,924 | 8/1980 | Fortunko et al. | 73/643 |
| 4,284,163 | 8/1981 | Pritchett | 181/401 X |
| 4,321,981 | 3/1982 | Waters | 367/189 X |
| 4,605,089 | 8/1986 | Kravchenko et al. | 181/401 X |
| 4,631,964 | 12/1986 | Sprunt et al. | 73/594 |
| 4,709,362 | 11/1987 | Cole | 367/189 |
| 4,749,057 | 6/1988 | Anstey | 181/121 |

FOREIGN PATENT DOCUMENTS

| | | | |
|---|---|---|---|
| 672588 | 5/1979 | U.S.S.R. | 181/121 |
| 682852 | 8/1979 | U.S.S.R. | 181/121 |

OTHER PUBLICATIONS

S. Hayashi et al., "A New Dynamic Control 4-Moment Vibration Generator", Meiden Rev. (Int. Ed.), Japan, Ser. No. 63, No. 3 (1981), pp. 32–36.

Primary Examiner—Brian S. Steinberger

[57] ABSTRACT

Apparatus for generating a controlled parameter elliptically polarized shear wave into an earth medium. The apparatus consists of a baseplate for engagement with the earth medium in omni-directionally resistant manner and a reaction mass and actuator assembly affixed thereto and energizable to impart reciprocal lateral forces to the base-plate that exert a predetermined resultant force at a controlled rate of rotation.

9 Claims, 6 Drawing Sheets

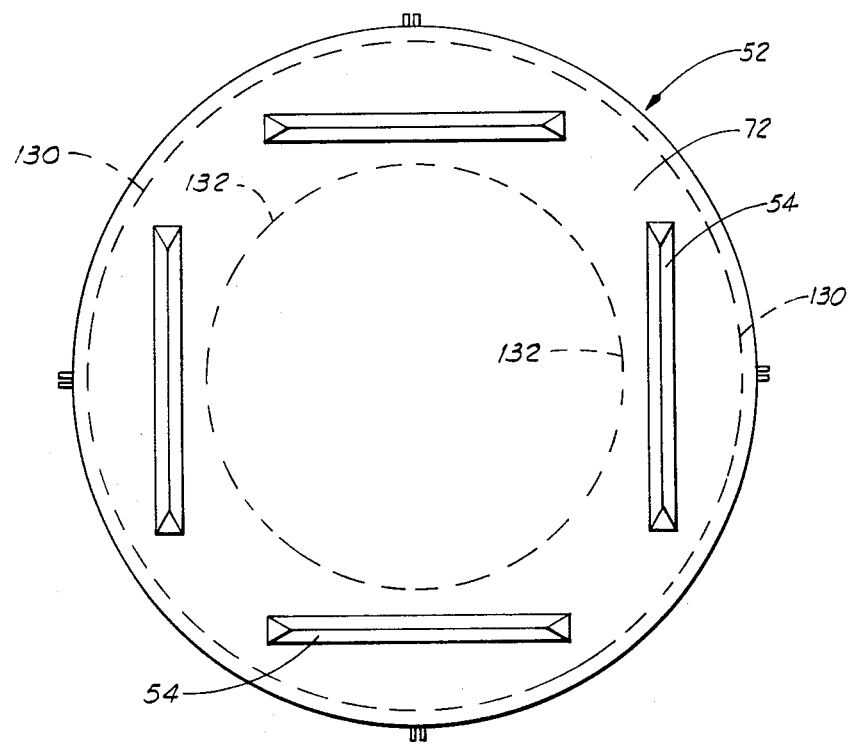
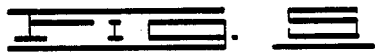
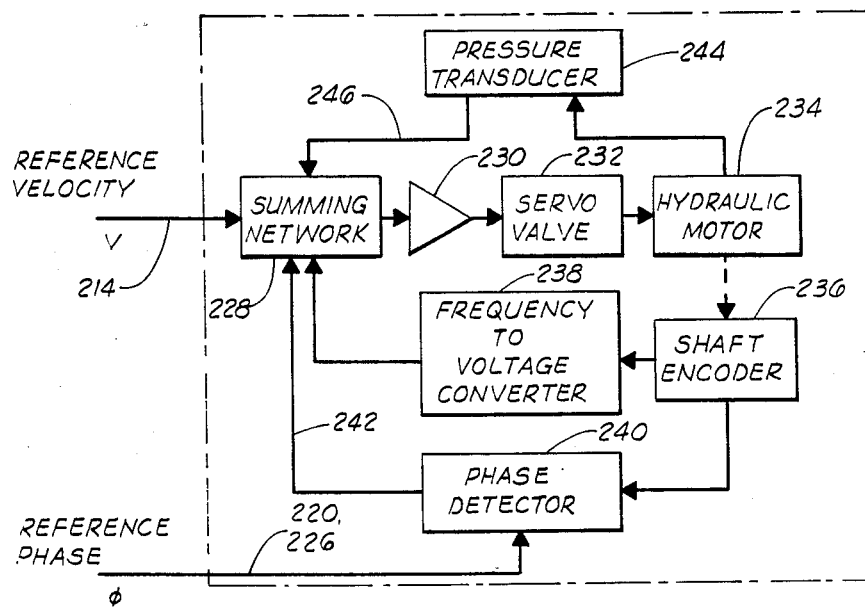
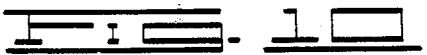

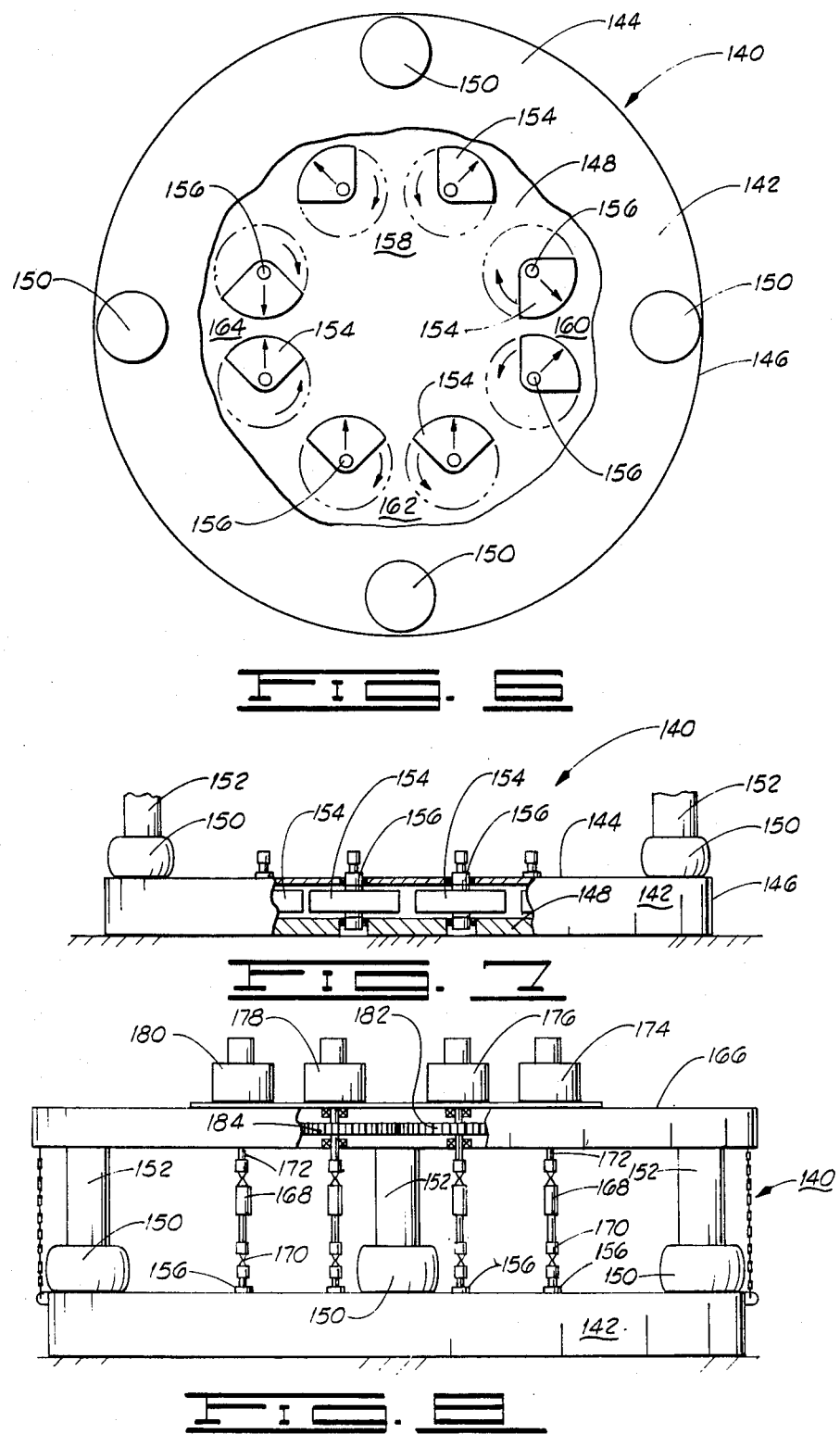

APPARATUS FOR GENERATING ELLIPTICALLY POLARIZED SHEAR WAVES

This is a divisional of co-pending application Ser. No. 897,434 filed on Aug. 18, 1986.

CROSS-REFERENCE TO RELATED APPLICATIONS

The subject matter of the present application constitutes generally related subject matter regarding concurrently filed U.S. patent applications, Ser. No. 897,448, now abandoned entitled "Method of Seismic Exploration Using Elliptically Polarized Shear Waves" (ICR 7435), and Ser. No. 897,442, now abandoned entitled "Method and Apparatus For Inducing Elliptically Polarized Shear Waves In an Earth Medium" (ICR 7648), each application being concurrently filed with the present application.

BACKGROUND OF THE INVENTION

1. Field of the Invention

The invention relates generally to seismic shear wave generators and, more particularly, but not by way of limitation, it relates to vibrator apparatus for generating elliptically polarized shear waves in an earth medium.

2. Description of the Prior Art

Applicant knows of no prior art that deals with methods or apparatus for generating elliptically polarized shear waves or for utilization of such shear waves in any form of seismic exploration. A search of the prior art discloses that the probable closest prior art are U.S. Pat. Nos. 3,280,935 and 3,034,594, each of which provide a relatively old teaching for generation of torsional shear waves. Each of these generators teaches an apparatus for cranking or torquing a surface of earth medium to generate such torsional wave energy. Generation of such torsional wave is an attempt to induce rotary particle motion, i.e. twisting, about an axis extending in the direction of propagation. This is an entirely different form of seismic wave than the elliptically polarized shear wave.

SUMMARY OF THE INVENTION

The present invention relates to structure for generating elliptically polarized shear waves and coupling said shear wave energy into the earth's surface for subsequent detection in any of various seismic sounding techniques. The invention consists of an earth-engaging baseplate that is omni-directionally resistant to horizontal movement, and such baseplate is driven by electrical or hydraulic means which apply a reciprocal linear force to the baseplate in at least two directions at controlled phase and angular relationship thereby to induce a polarized shear wave in the earth that behaves in accordance with a predetermined elliptical function.

More specifically, a vibrator may be center-mounted on a truck in conventional manner and may include a jack assembly and baseplate carrying a reaction mass connected thereto, and may include such as a plurality of quadrature arrayed drive pistons which push radially on the baseplate at controlled phase differential thereby to induce an elliptically polarized shear wave in the earth medium.

Therefore, it is an object of the present invention to provide a vibratory source of elliptically polarized shear waves.

It is also an object of the present invention to provide an elliptically polarizes shear wave source that is readily controllable and reliable as to true shear wave output.

It is still further an object of the present invention to provide a shear wave vibrator that may be readily controlled to output any of several shear waves including circularly polarized, elliptically polarized, plane polarized, or signature-shape polarized.

It is still another object of the invention to provide a shear wave generator that also generates compressional waves without a second harmonic or double frequency component.

Finally, it is an object of the present invention to provide a universal form of vibrator suitable for use in vertical seismic profiling, linear and 3-D seismic surveys, and general seismic exploration usage.

Other objects and advantages of the invention will be evident from the following detailed description when read in conjunction with the accompanying drawings which illustrate the invention.

BRIEF DESCRIPTION OF THE DRAWINGS

FIG. 5 is a view of the bottom of a baseplate with one form of cleating structure;

FIG. 6 is a top plan view of a baseplate with parts shown in cutaway of an alternative form of shear wave generator;

FIG. 7 is a view in side elevation of the baseplate of FIG. 6 with parts shown in cutaway;

FIG. 8 is a view in side elevation of the baseplate of FIG. 6 illustrating the gear interconnection and elevation structure;

FIG. 9 is a block diagram illustrating electronic control circuitry utilized in the present invention;

FIG. 10 is a block diagram of hydraulic control circuitry utilized in the present invention;

DETAILED DESCRIPTION OF THE INVENTION

Figure 1:
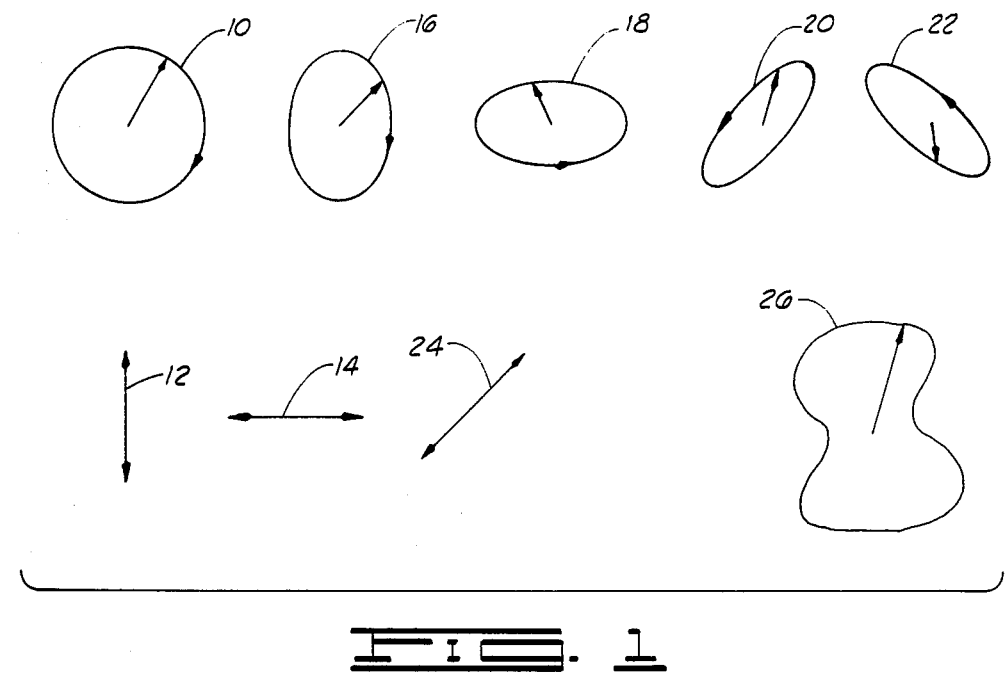
FIG. 1 is a geometric illustration of the various forms of output that are generated in accordance with the present invention.

FIG. 1 illustrates a number of different shear wave configurations, i.e. polarizations, that can be developed by apparatus of the present invention. The circular polarized shear wave 10 can be generated by a basic eccentric rotating weight transducer as disclosed in a concurrent filed patent application, and plane polarized shear waves 12 and 14 can be similarly generated. More versatile ellipsoid shear waves 16, 18, 20 and 22 as well as the angular plane polarized shear wave 24 can be generated using the vibratory baseplate and reactance schemes disclosed in the present application. In addition, the preferred embodiment of the invention enables very precise control capable of generating a signature form polarized shear wave 26 in an earth medium.

Figure 2:
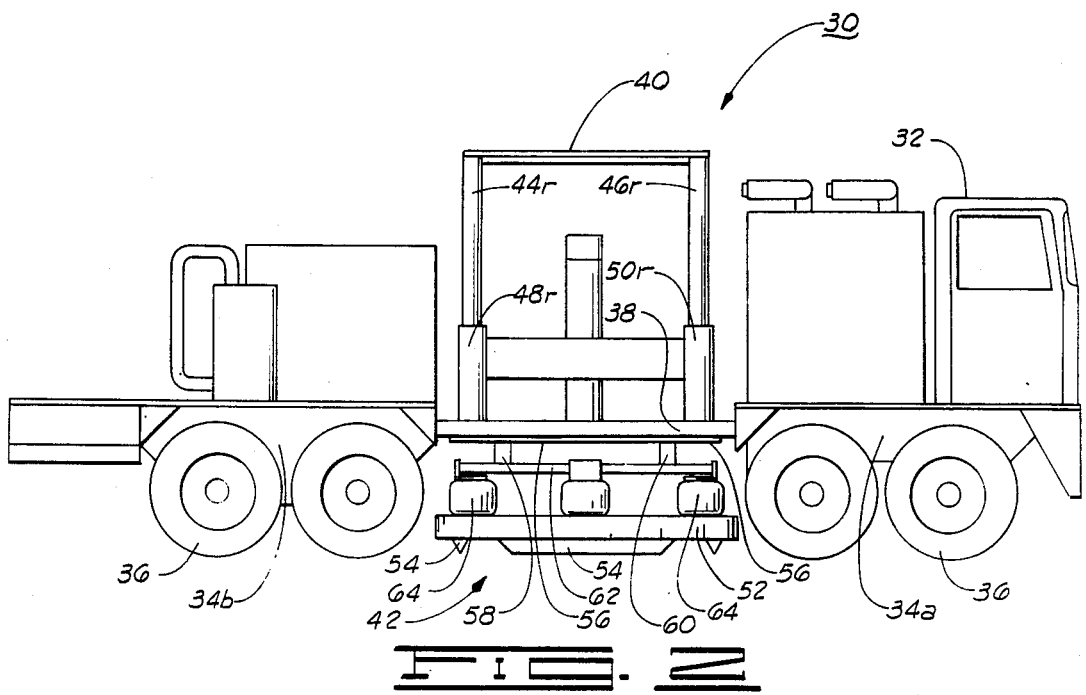
FIG. 2 is a view in side elevation of an elliptically polarized shear wave vibrator as disposed in center-mount on a carrier vehicle.

FIG. 2 illustrates a preferred form of the invention as center-mounted on a carrier vehicle 32. The vehicle 32 includes a specially formed two-part frame 34a and 34b and a plurality of wheels 36 while including a carrier frame 38 extending through the middle. The carrier frame 38 provides support for a jack assembly 40 carrying a vibrator 42 therebeneath. The special design, heavy duty vehicle 32 has been utilized in seismic work for a number of years and such custom vehicles are available from Crane Carrier Corporation.

The jack assembly 40 is a standard type used with center-mount vibrator carriers and includes a bridge member having a pair of vertical piston rods 44, 46 (both left and right side) that are hydraulically movable down through respective sleeves 48, 50 thereby to raise the weight of a portion of the carrier 32 upward to act as a hold-down on a baseplate 52 of vibrator 42. The baseplate 52 includes gripping structure, e.g. cleats 54 which serve to maintain the baseplate in firm engagement with the earth. Cleats 54 are arrayed to maintain baseplate 52 in omni-directional resistance to lateral movement. Each of rods 44, 46 on both right and left sides extend down into secure engagement with such as a plate 56 that is secured through transverse frames 58, 60 to longitudinal tubing members 62. Two or more longitudinal tubing members 62 are then secured to air mounts 64 which, in turn, are secured to suspend baseplate 52 in isolation, as will be further described below.

Figure 3:
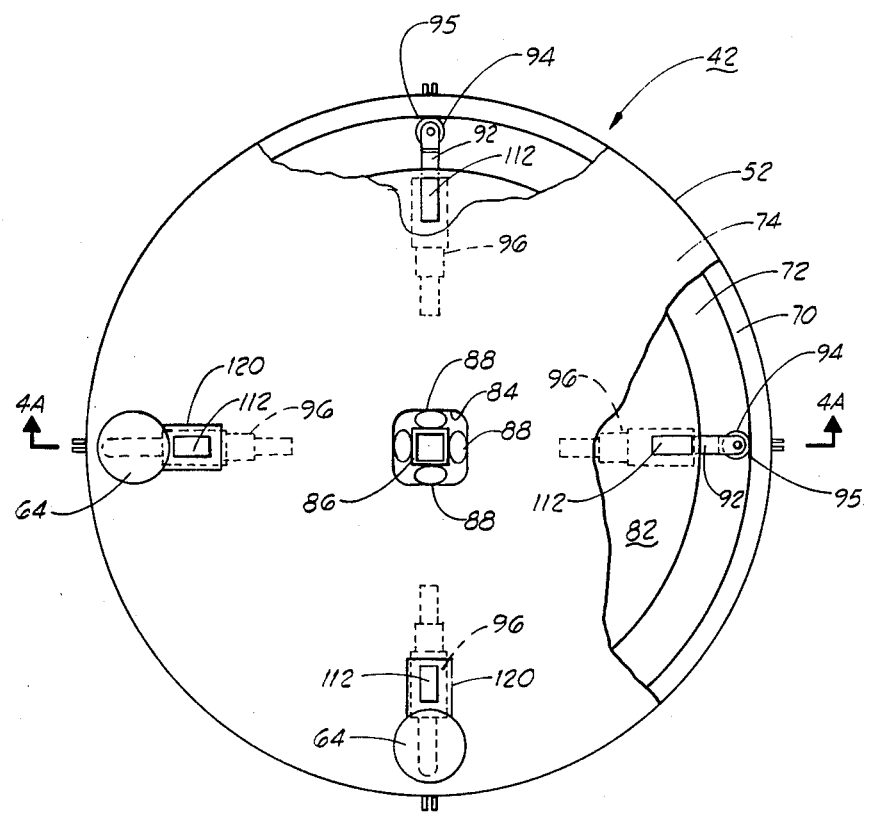
FIG. 3 is a top plan view of a vibrator baseplate with parts shown in cutaway.
Figure 4A:
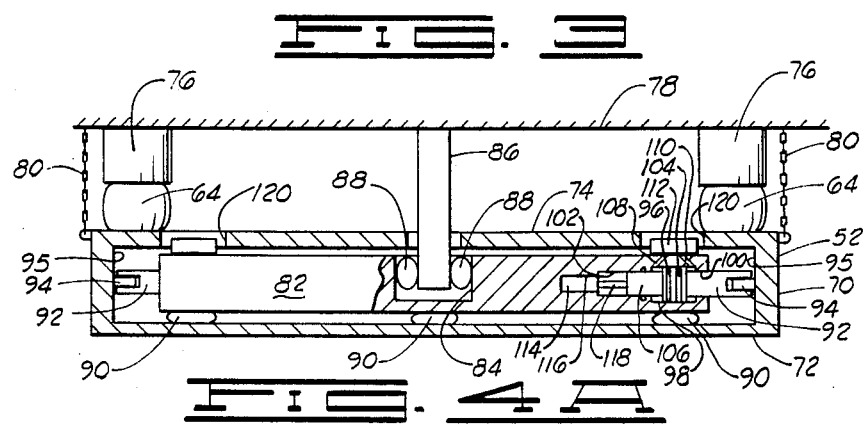
FIG. 4A is a view in vertical cross-section of the baseplate of FIG. 3.

FIGS. 3 and 4A illustrate a baseplate 52 of a vibrator 42. The baseplate 52 consists of a flat, cylindrical shell preferably formed of steel and having a side wall 70, a bottom plate 72 and a top plate 74. The baseplate 52 is suspended beneath a plurality of air bag isolation mounts 64. In thise case air mounts 64 are in quadrature array as they are adapted for connection through posts 76 in connection to the elevating structure 78. Safety chains 80 provide vertical support for baseplate 52 when in the non-use attitude, e.g. during travel along highways. The elevating structur 78 and posts 76 are merely an equivalent of the jack structure seen in association with frame 38 in FIG. 2.

A reaction mass 82 of solid metal having a diameter slightly less than the inside diameter of cylindrical side wall 70, is supported in isolation within baseplate 52. The reaction mass 82 includes a central counterbore 84 which serves as a centering hole. Thus, a square centering tube 86 secured on the elevating structure 78 extends downward into the axial bore 84 whereupon it is affixed in isolation by a quadrature array of air mounts 88 to the respective side of the generally square hole 84. Thus, reaction mass 82 is restrained within baseplate 52 but generally free-floating there within as it is further supported on the underside by a quadrature array of air mounts 90.

The reaction mass 82 functions relative to the baseplate 52 through a quadrature array of radially extensible shafts or rod ends 92 having contact rollers 94. Each of the shafts 92 is then actuated reciprocally to push against a respective flat race 95 formed on the inner wall of cylindrical side wall 70. The shafts 92 are actually the outer rod ends of a hydraulic reactor 96, and roller 94 maintains continuous contact with flat surface 95 of side wall 70. Four such hydraulic reactors 96 are disposed in the reaction mass 82 in quadrature array and directed to exert a radial reciprocal force against respective flat surfaces 95 formed on side wall 70 inner wall.

Thus, each hydraulic reactor 96 consists of a radially aligned cylinder 98 formed with an annular shoulder wall 100 and sealing member (not shown) as well as an interior bore wall 102. A double rod end piston 104 having an interior rod end 106 and and exterior rod end which is actually the shaft 92 is disposed for reciprocation within cylinder 98. Any of various bronze liners, packing members and O-ring combinations may be used along the cylinder walls and bores in accordance with recognized vibrator construction techniques.

Hydraulic fluid is alternatively ported through ports 108 and 110 to oppose sides of piston 104 under control of a servo valve 112 disposed on the upper surface of reaction mass 82. A linear variable differential transformer (LVDT) of well-known type is used to provide correction feedback error relative to piston displacement. Thus, the LVDT transformer coil 114 is disposed within a radial counterbore 116 and the sensor stem 118 of the LVDT reciprocates therein. Electrical circuitry (not shown) interconnects between LVDT 114 and servo valve 112 as well as to the central electronic control circuitry in well-known manner. Access holes 120 allow connection of electrical and hydraulic lines.

A standard type of vibrator control electronics can be utilized to develop the requisite control signal of predetermined frequency, amplitude and duration. Actual field testing has been carried out using the Advance 1, Model 4 Seismic Vibrator Electronics as is available from Pelco Electronics Corp. of Ponca City, Oklahoma. The basic equipment receives only slight modification to shift the phase of one control signal output in order to apply properly phasedisplaced dirve signals to respective cross-oriented vibrators.

The modification is simple and readily made in the field as it is only necessary to provide a single wire jumper across a portion of the High/Low frequency switch in the control system. Thus, in the phase control Section E of the Advance 1 system, a wire jumper short across the "LOW FREQ" switch connecting connector P72, PIN 8 with module E7-4, PIN 2 effects a 90° phase shift of output sweep signal. This modification allows for one 90° phase shift by reversing one side of the switch. While selected frequency vibrator control is discussed above, the elliptical shear wave vibrator may be operated under any of pulse, swept frequency or continuous frequency control.

Figure 4B:
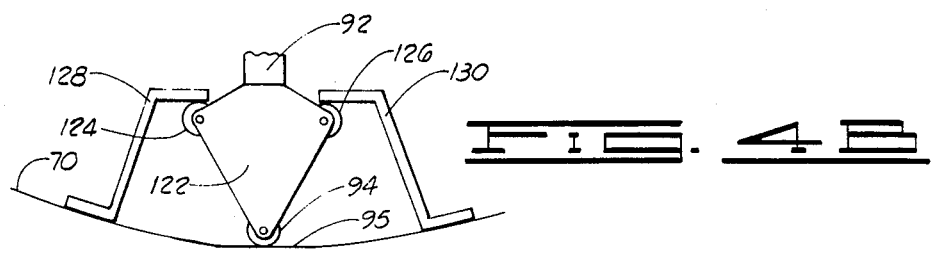
FIG. 4B is an alternative form of structure that may be utilized in the vibrator of 4A.
Figure 3:
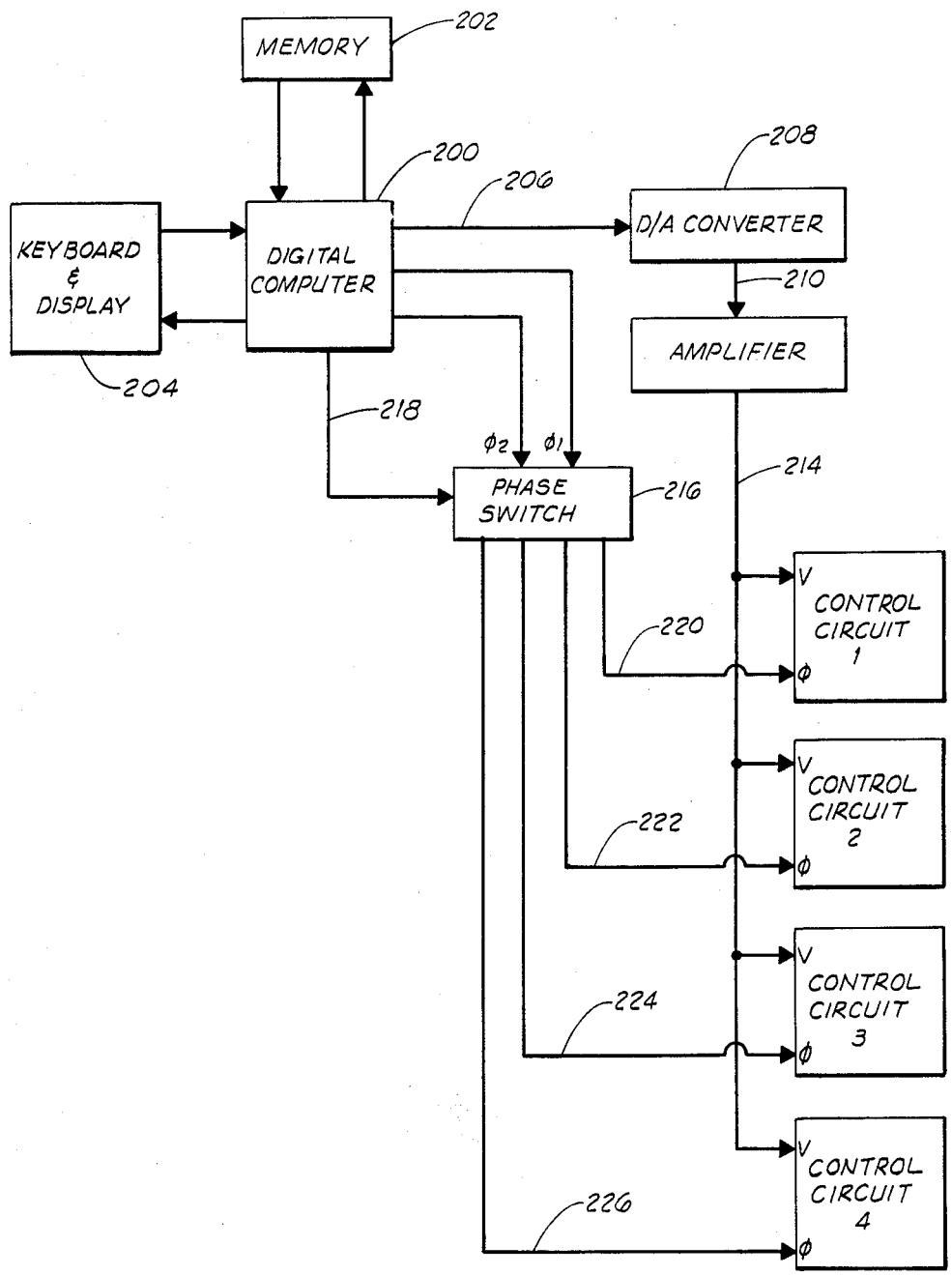

The outer rod end 92 is preferably keyed or splined to give an anti-rotation restraint, and such means are well-known to the skilled artisan. FIG. 4BG illustrates an alternative form of actuation device wherein a push-pull effect is achieved rather than just a simple uni-directional push. Thus, the outer rod end 92 is formed to include triangular plates 122 carrying not only the outer roller 94, but also a pair of inner rollers 124 and 126. Internal contact surfaces are then formed by respective brackets 128 and 130 as they are welded to the inside wall of side wall 70 to provide a pull-stroke surface that is in continuous contact with respective pulleys 124 and 126.

FIG. 5 illustrates a bottom surface cleating configuration that may be utilized on such as baseplate 52. Thus, a plurality of cleat structures 54 (as shown in FIG. 2) may be utilized in some balanced circular array that provides omni-directional resistance to lateral movement of baseplate 52. Still other cleating arrangements may be such as a simple comb in circular form around either the outer diameter as at dash line 130 or around some intermediate diameter or circumference 132, or a combination of such concentric cleating structures. The number and configuration of such cleating structures might be selected in accordance with the exigencies of particular applications, soil consistencies and the like. Further, some situations achieve favorable inducement of energy through the use of plural concentric urethane rings secured on bottom plate 72.

In operation of the electrohydraulic concept as illustrated in FIGS. 3 and 4A, the baseplate 52 is placed in firm engagement with the earth's surface as by placing the weight of the support vehicle thereover. The respective servo valves 112 then port hydraulic fluid from the hydraulic pressure and reservoir system (not specifically shown) via ports 108 and 110 to each side of each respective piston 104 of each hydraulic actuator 96. In each pair of coaxial cylinders 98, i.e. opposite side hydraulic actuators 96, the piston 104 movement is synchronized such that the piston assembly on one side is radially extending while the other is radially retracting and vice-versa. The two pairs of hydraulic actuators 96 reciprocate with the same frequency; however, the phases may be adjusted selectively to allow different modes of polarization. Also, the force and/or stroke amplitudes may differ as required in order to produce a desired elliptical motion.

Particle displacement in the earth medium beneath baseplate 52 may be thought of as being composed of two components which are perpendicular to the direction of propagation. Consider two plane-polarized shear waves of the same frequency whose particle displacements are given by $$\vec{D}_x = \vec{a}_x D_1 \cos(wt - kz) \quad (1)$$
$$\vec{D}_y = \vec{a}_y D_2 \cos(wt - kz + \phi)$$

where $D_1$ and $D_2$ are displacement amplitudes, $\vec{a}_x$ and $\vec{a}_y$ are unit vectors in the x and y directions, respectively, and k is a propagation constant. Both waves are travelling in the z direction, but are polarized perpendicular to each other and have a phase difference $\phi$. Total displacement at any point on the z axis (assuming zero attenuation) will then be given by $$\vec{D} = \vec{a}_x D_1 \cos(wt - kz) + \vec{a}_y D_2 \cos(wt - kz + \phi) \quad (2)$$

For the special case where $\phi$ is equal to $+\pi/2$, expanding the above equation gives $$\vec{D} = \vec{a}_x D_1 \cos wt - \vec{a}_y D_2 \sin wt \quad (3)$$

For the case where $D_1/D_2$ is $<1$, the resultant displacement vector traces out an ellipse with its major and minor axes coincident with the y and x axes, respectively. If $D_1/D_2$ is $>1$, the major and minor axes of the ellipse coincide with the respective x and y axes. Thus, looking into the beam along the z axis, the vector rotates in the clockwise direction at an angular frequency w and is called a right elliptically polarized wave. If $\phi$ has been equal to $-\pi/2$, the resultant vector path would trace out the same ellipse except that the displacement vector would sweep in a counterclockwise direction and be termed a left elliptically polarized shear wave.

In the special case where $D_1 = D_2$, the vector transcribes a circle and, depending on the value of $\phi$, the wave may be right or left circularly polarized. Also, $D_1$ need not equal $D_2$, and $\phi$ may assume values other than $\pm \pi/2$, in which case the major and minor ellipse axes will not coincide with the x or y axes.

FIGS. 6 and 7 illustrate a second type of elliptically polarized shear wave vibrator 140 of a type that uses coordinated rotating eccentric weights to set up baseplate vibration. Thus, a baseplate 142 consists of a top plate 144, cylindrical side wall 146, bottom plate 148 and suitable cleat structure (not shown). The baseplate 142 is operatively suspended by a quadrature array of air mounts 150 from a respective quadrature array of support posts 152. Plural pairs of rotary eccentric weights are then disposed, again in quadrature array, in equally offset relationship in the baseplate 142. Thus, there are four sets or pairs of eccentric weights 154 rotationally supported on rotary shafts 156. Thus, quadrature arrayed weight pairs 158, 160, 162 and 164 are each disposed in similar spacing and configuration in each respective quadrant of baseplate 142. Each respective rotary shaft 156 is suitably journalled for rotary support between the lower plate 148 and upper plate 144 of baseplate 142.

It may be noted that each pair 158-164 of eccentric weights is counter rotating each to the other and that each pair has a unique alignment relationship with respect to the remainders. This, of course, is adjustable in keeping with the particular sweep form to be generated. A variety of operational modes may be achieved. In one mode, the four rotor pairs 158-164 all counter rotate at the same frequency, with the rotors maintaining mirror-image positions in each pair. As the frequency is swept, the phase differences between pairs 158 and 162 and between pairs 160 and 164 are adjusted by the control system to provide force amplitude control. Also, the phase between quadruple rotor sets 158 and 162 and quadruple rotor sets 160 and 164 can be controlled to establish the desired elliptical polarization.

As shown in FIG. 8, the vibrator 140 may also be mounted on a carrier vehicle as support posts 152 are secured to an elevating structure 166, in this case a generally cylindrical housing that also provides housing for the counter rotating gears driving the respective rotors. Thus, each of the rotary shafts 156 is suitably journalled within baseplate 142, and torque to each is transmitted by means of an extendable spline shaft 168 and universal joint 170 as connected for rotation from a respective rotary drive shaft 172. The respective drive shafts 172 are either driven by one of the paired hydraulic motors 174, 176, 178 and 180, or from a respective slaved drive shaft receiving rotation from drive gears 182-184 for each pair.

Figure 11:
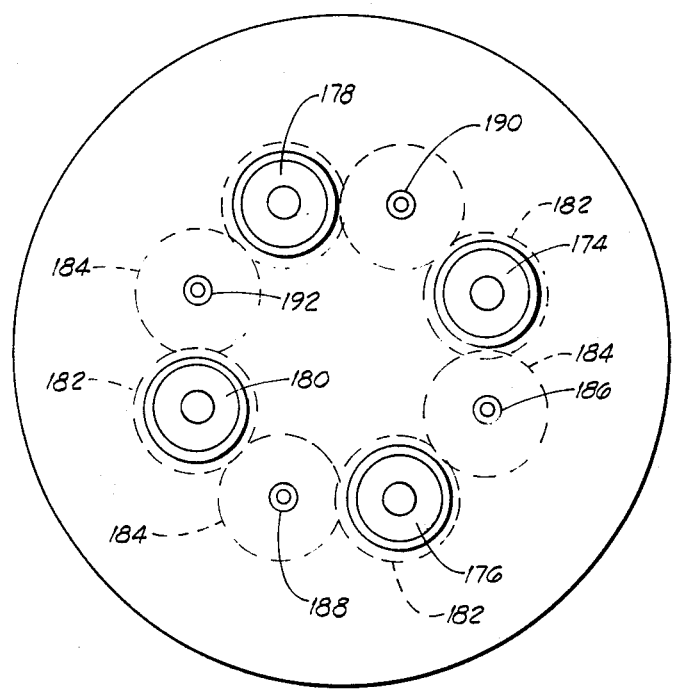
FIG. 11 is a top plan view of the elevating structure of FIG. 8.
Figure 12:
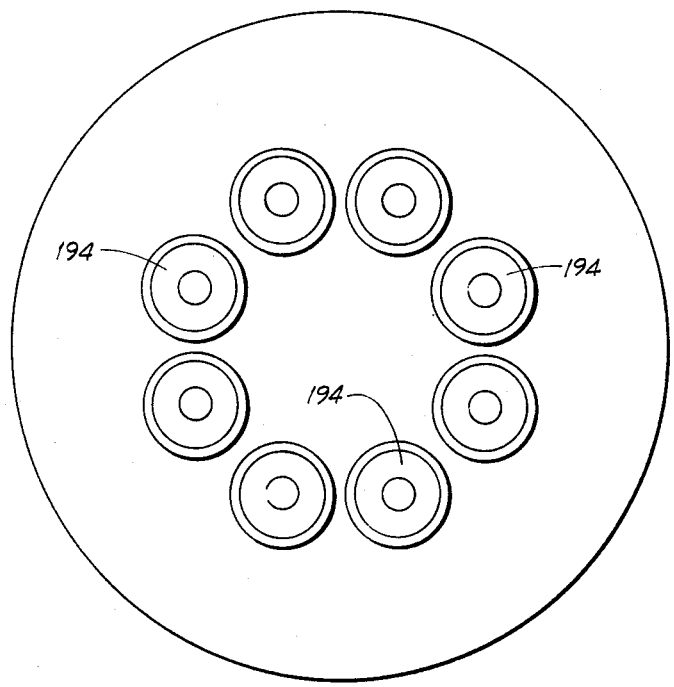
FIG. 12 is a top plan view of an alternative form of elevating structure for use with the baseplate of FIG. 6.

Thus, as shown in FIG. 11, the vibrator 140 may be controlled with four hydraulic motors 174, 176, 178 and 180 driving each respective rotor pair as by gear interconnection to the respective rotor shafts as positioned in adjacent journal bearings 186, 188, 190 and 192. Alternatively, a drive system may be utilized wherein each of the eight rotors is independently driven by an individual servo motor 194 as shown in FIG. 12. While increasing control complexity, the independent servo motor drive arrangement greatly increases the versatility of mode selection and control and in many cases it may be a preferred configuration. In the design of FIGS. 6, 7 and 8, the feature of mounting the drive system on the elevating structure 166 significantly reduces the overall weight of baseplate 142 and thus enhances vibrator efficiency.

While any of a number of electrohydraulic control systems might be utilized to control operation of the shear wave vibrator 140, a preferred form of circuit is indicated in FIGS. 9 and 10. Operator control may be input at a digital computer 200, e.g. a standard control microprocessor circuit, functioning with a suitable memory 202 and keyboard and display 204. To control the multi-directional vibrator, it is required to correctly switch the combination of drives to the mode selected. Thus, the computer 200 produces a digital voltage sweep signal on lijne 206 to D/A converter 208 which provides an analog output signal on lead 210 to an amplifier 212. The analog signal as amplified and output on lead 214 is an operation control voltage of designated frequency, sweep length, duration and the like. The generated voltage on lead 214 is then applied as input to each of control circuits 1-4 as applied to control respective rotor pairs.

The computer 200 also outputs two digital pulse trains at selected phases $\phi_1$ and $\phi_2$ which feed through a phase switch 216. The phase switch 216 under control of computer 200 via line 218, switches selected phase signal trains via leads 220, 222, 224 and 226 for input to the phase inputs of each of the respective control circuits 1-4. Phase $\phi_1$ signal will go to one pair of control circuits while phase $\phi_2$ signal goes to the other pair of control circuits, depending on the operating mode selected by the phase switch control. During a sweep, phase $\phi_1$ is adjusted with respect to phase $\phi_2$ to allow change to the phase angle difference.

FIG. 10 illustrates a single one of the control circuits of FIG. 9 as it receives reference velocity input on lead 214 and reference phase input on one of leads 220-226. Thus, a summing network 228 provides processing of plural error signals to construct a final drive signals as output through amplifier 230 to a respective servo valve 232 to control a respective one of the hydraulic motors 234. Position information from hydraulic motor 234 is sensed by a shaft encoder 236 which provides both voltage and phase feedback as the output is passed through a frequency to voltage converter 238 toprovide feedback into summing network 228, and encoder 236 also provides input to a phase detector 240 for comparison to reference phase input and generation of a phase correction signal on lead 242 to summing network 228. The summing network also receives feedback of an instantaneous hydraulic pressure indication from pressure transducer 244 in association with hydraulic motor 234. Thus, the total drive signal is developed in summing network 228 for application to control servo valve 232.

Referring again to FIG. 9, the computer 200 can also function before start of any sweep to initialize all drives, i.e. synchronize drives at a pre-sweep speed of angular rotation and of phase angle. Such control system as that of FIG. 9 would be easily contained at one operator station in a single vibrator vehicle. Also, multiple vibrators could be tied together for synchronous operation in a manner similar to that presently used for synchronizing multiples of conventional vibrators.

The foregoing discloses a novel form of seismic energy generator that is capable of inducing an elliptically polarized shear wave into an earth medium for subsequent detection and seismic processing. It is presently contemplated that such elliptically polarized shear waves are capable of interacting with earth substances and carrying a much increased content of seismic information that is susceptible of detection, classification and interpretation. Waves generated in accordance with the present invention should well lead to new and different forms and layouts for exploration and these in turn should bring about new interpretive techniques utilizing new data determinations and interactions.

Changes may be made in combination and arrangement of elements as heretofore set forth in the specification and shown in the drawings; it being understood that changes may be made in the embodiments disclosed without departing from the spirit and scope of the invention as defined in the following claims.

The embodiments of the invention in which an exclusive property or privilege is claimed are as follows:

1. Apparatus for generation of elliptically polarized shear waves in an earth medium, comprising:
   baseplate means including an earth engaging surface which is generally equally omni-directionally resistant to movement relative to said earth medium;
   at least one pair of counter-rotating shafts affixed generally centrally to said baseplate means in spaced, parallel alignment for journaled rotation in said baseplate means;
   at least one pair of eccentric masses with each mass secured on a respective one of a said shafts in mirror-image alignment;
   drive means for counter-rotating the at least one pair of said shafts at controlled rotational speed to generate a force directed radially outward against the omni-directional resistance of said baseplate means and generally parallel to the earth engaging surface, which radially directed force is instantaneously linear but rotating at a predetermined angular velocity relative to a point within said earth engaging surface of said baseplate means.

2. Apparatus as set forth in claim 1, wherein said force generating means comprising:
   four pairs of counter-rotating shafts, each pair being disposed in spaced alignment for journaled rotation in said baseplate means, and the pairs being positioned equi-radially from the center of the baseplate means in quadrature array;
   four pairs of eccentric masses secured on said respective shafts with each pair of masses affixed in mirror-image to the respective pair of shafts and each pair of eccentric masses being differently oriented rotationally; and
   drive means for counter-rotating said four pairs of shafts at a controlled rate of rotation.

3. Apparatus as set forth in claim 2 wherein said drive means comprises:
   gear means interconnecting between each pair of shafts; and
   motor means connected to apply rotational drive to a respective shaft of each pair.

4. Apparatus as set forth in claim 3 which further includes:
   means constructing a control reference signal of preselected frequency and duration;
   phase switch means providing plural phase outputs; and
   plural control circuit means each receiving said control reference signal and one of said plural phase outputs to control the drive of a respective motor means.

5. Apparatus as set forth in claim 4 wherein:
   said means constructing and said phase switch means are a digital computer means.

6. Apparatus as set forth in claim 2 wherein said drive means comprises:
   gear means interconnecting between each pair of shafts; and
   four motor means connected to apply rotational drive to a respective shaft of each pair.

7. Apparatus as set forth in claim 2 wherein said drive means comprises:
   eight motor means connected to apply rotational drive to respective shafts of each pair in synchronous relationship.

8. Apparatus as set forth in claim 2 which is further characterized to include:
   vehicle means with frame having a vertical jack assembly secured to the frame; and
   isolating air mounts securing said baseplate means to said jack assembly beneath the frame of said vehicle means.

9. Apparatus as set forth in claim 2 wherein: the phase differential of said four pairs of counter-rotating eccentric masses imparts an orbital motion to said baseplate means.

* * * * *